(12) United States Patent
Mateina

(10) Patent No.: US 6,473,917 B1
(45) Date of Patent: Nov. 5, 2002

(54) DEVICE FOR CONTROLLING THE FILLING OF A SANITARY TUB

(75) Inventor: Ludger Mateina, Ahlen (DE)

(73) Assignee: Franz Kaldewei GmbH & Co. KG, Ahlen (DE)

( * ) Notice: Subject to any disclaimer, the term of this patent is extended or adjusted under 35 U.S.C. 154(b) by 0 days.

(21) Appl. No.: 09/878,150

(22) Filed: Jun. 8, 2001

(30) Foreign Application Priority Data

Apr. 14, 2001 (EP) .............................................. 01109237

(51) Int. Cl.$^7$ ............................. E03C 1/04; G05D 23/13
(52) U.S. Cl. ......................................... 4/676; 236/12.12
(58) Field of Search ........................... 236/12.12, 12.11, 236/12.15; 4/676

(56) References Cited

U.S. PATENT DOCUMENTS

| | | | | |
|---|---|---|---|---|
| 4,711,392 A | * | 12/1987 | Kidouchi et al. | ........ 236/12.12 |
| 4,976,460 A | * | 12/1990 | Newcombe et al. | ..... 236/12.12 |
| 5,032,992 A | * | 7/1991 | Bergmann | ............... 236/12.12 |
| RE35,018 E | * | 8/1995 | Homan | .................... 236/12.12 |

FOREIGN PATENT DOCUMENTS

| | | | | |
|---|---|---|---|---|
| DE | 296 20 414 | 1/1997 | ............. | G05D/7/06 |
| EP | 0 358 173 | 3/1990 | .......... | G05D/23/13 |
| EP | 0 890 717 | 1/1999 | ............. | F01P/7/16 |
| EP | 0 995 844 | 4/2000 | ............. | E03C/1/23 |
| GB | 2174219 | * 10/1986 | .......... | G05D/27/02 |
| GB | 2242758 | * 10/1991 | ........... | G05D/11/16 |

* cited by examiner

*Primary Examiner*—William Wayner
(74) *Attorney, Agent, or Firm*—Collard & Roe, P.C.

(57) ABSTRACT

A device is provided for controlling the feed of mixed cold and hot water and the temperature of the mixed water in a sanitary installation, in particular for controlling the filling of a sanitary tub. The device comprises a mixing valve located in the water feed line, and an electronic controlling device associated with the mixing valve. The electronic controlling device comprises interfaces for connecting at least one data input and output device, a temperature sensor and a system for detecting the filling level in the tub. The mixing valve comprises a valve block containing separate inlets for cold and hot water, and a channel for mixed water with a mixed-water outlet, and valve chambers for rotary valves with rotating valve bodies. Two rotary valve drives connected to the controlling device are secured on the outer side of the valve block. The mixing ratio of the incoming flow of cold and hot water, as well as the total volume of the flow of water can be controlled by the setting movement of the rotary valves controlled by the electronic controlling device. In addition, at least one shutoff valve that can be actuated by the controlling device is associated with the mixed-water outlet.

13 Claims, 6 Drawing Sheets

DEVICE FOR CONTROLLING THE FILLING OF A SANITARY TUB

BACKGROUND OF THE INVENTION

1. Field of the Invention

The invention relates to a device for controlling the feed of mixed cold and hot water and the temperature of the mixed water in a sanitary installation, and in particular for controlling the filling of a sanitary tub. The device comprises a mixing valve located in the feed line of the water, and an electronic control system associated with the mixing valve. The electronic control system comprises interfaces for connecting at least one input and output device, a temperature sensor, and a device for detecting the filling level of the tub.

2. The Prior Art

A device known from GB-A 2 174 219 for controlling the filling of a sanitary tub comprises valves connected to an electronic control system, which can be controlled independently of each other for metering the flow of the cold and hot water. A temperature sensor and a system for controlling the filling level of the tub are also connected to the control system. The electronic control system can be programmed using a data input and output device, which is arranged on the ledge of the sanitary tub, and permits automatic filling of the tub at a preset water temperature and with a preset amount of water.

In a system known from GB-A 2 242 758, separate feed lines are connected to a sanitary tub for feeding the hot and cold water. The two feed lines are each equipped with a device measuring the through-put, a temperature-measuring device, and control valves for regulating the volume of water flowing through each feed line. The control system permits the sanitary tub to be filled automatically. The amount of water, the temperature of the water and the point in time of the filling of the tub can be preset by means of a data input and output device. The values can be stored. Setting up the tub system with the associated controlling devices as well as the measuring and controlling technology requires costly expenditure. The installation work has to be carried out on site by skilled personnel.

The invention addresses the problem of providing a device for controlling the feed of the mixed water and the temperature of the mixed water in a sanitary installation that has a simple and compact structure and is easy to install. The device also has to permit automation of the filling operation of a sanitary tub to a great extent.

SUMMARY OF THE INVENTION

In accordance with the invention, the problem is solved by a sanitary assembly in which the mixing valve comprises a valve block containing separate inlets for cold and hot water, a channel for mixed water with a mixed-water outlet, and valve chambers for rotary valves having rotating valve bodies. Two rotary valve drives for actuating the rotary valves are electrically connected to a control system and are secured on the outer side of the valve block. At least one switchable shutoff valve is associated with the mixed-water outlet.

The mixing ratio of the feed of cold and hot water as well as the total volume of the feed of water can be controlled by setting the movements of the rotary valves controlled by the electronic control system. The assembly can be used, for example, in conjunction with a shower to control the flow rate and the temperature of the shower water. The device is mainly suitable for controlling the filling level of a sanitary tub. According to a preferred embodiment of the invention, a distributor is connected to the mixed-water outlet. The distributor comprises at least two outlets equipped with shutoff valves, whereby the shutoff valves can be actuated by the control system.

The measuring device for measuring the volume of the through-put is preferably arranged between the mixed water outlet of the valve block and the distributor on the outlet side. The temperature sensor can be inserted in the mixing channel of the valve block through an opening in the side of the valve block. However, the temperature sensor may also be arranged in the distributor. Arranging all rotary valves in one single valve block, which supports the required rotary valve drives on the outer side, leads to a very compact structure of the aggregate. The device permits controlling the amount of mixed water and the temperature of the mixed water with the help of only two rotary valve drives. By switching the outlet valves, which may be simple magnetic valves, and which are controlled by the electronic control system, the mixed water may be fed selectively, for example, to a tub inlet or to a hand-held shower head.

The assembly may be constructed in a variety of ways. According to a first embodiment, rotary valves are arranged only in the cold water inlet and the hot water inlet. Rotary valve drives that can be controlled independently of each other are associated with the cold and hot water inlets. This embodiment has a particularly simple equipment structure. The positions of the rotary valves are fixed by the control program of the electronic control system. The program takes into account the through-put characteristics of the rotary valves, so that the mixed water is available with the preset amount of through-put and at the preset temperature for the mixed water.

According to a second embodiment, a rotary valve is arranged in each of the cold water inlet, the hot water inlet and the mixed-water channel. The rotary valves located in the cold water inlet and the hot water inlet are mechanically coupled with each other and comprise a common rotary valve drive. The second rotary valve drive is associated with the rotary valve located in the mixed-water channel. Both rotary valve drives can be controlled independently of one another. Mechanical coupling of the rotary valves located in the cold water inlet and the hot water inlet can be achieved in a simple manner. The mechanically coupled rotary valves preferably comprise outwardly extended actuation shafts, with toothed gears mating with each other being arranged on the shafts. By mechanically coupling the valves arranged in the cold water and hot water inlets, only one rotary valve drive is required for controlling the mixing ratio and consequently the water temperature. The valve bodies of the mechanically coupled rotary valves are preferably designed and arranged so that when the valves are actuated within their range of adjustment, the cross section of the flow will remain approximately constant overall. The temperature of the water consequently can be controlled without influencing thereby the amount of the water. The volume of the water through-put is controlled by the rotary valve located in the mixed-water channel, the rotary valve being controlled by the second servo-motor. As compared to the first embodiment described above, this embodiment of the mixing fitting is more expensive; however, the control process is simplified because the control circuits for controlling the through-put are decoupled from the control circuits that control the temperature.

The mixing valve in accordance with the invention may be designed with a compact structure, so that the mixing value and the electronic control system associated therewith may be arranged within a space enclosed by a lining of the tub. The electronic control system can be controlled and programmed in this connection by at least one external data input and output device.

The data input and output device comprises a system for wireless or line-bound data transmission and can be equipped for operating on the power mains or on batteries/accumulators. The data input and output device comprises keys for starting and stopping the device (ON/OFF), for reversing the flow path between a tub inlet and a hand-held shower head, and for pre-selecting the flow volume. Keys are also provided for inputting preset values for the water temperature and/or the filling amount of water and/or the time at which the tub is to be filled. The data input and output device also preferably comprises memory keys for storing preset values, as well as a display device for displaying the adjusted values. It is understood that it is possible for the display device to display not only the preset values, but also the actual values. For example the temperature value of the bathing water and the amount of water actually filled in the sanitary tub may be displayed. For using the device in moist rooms, the data input and output device is preferably equipped with a watertight foil keyboard. The device can be designed as a mobile device for remote control, or it can be installed in the ledge of the sanitary tub. Other embodiments include having the data input and output device inserted on the side of a wall in a socket installed beneath the wall plaster.

In accordance with the invention, the assembly may include a variety of devices connected to the electronic control system. For example, a tub thermometer and/or a device for detecting the tub filling level and/or a loudspeaker for transmitting a sound signal may be connected to the electronic control system. The device for detecting the filling level may comprise, for example, a pressure sensor and/or a device for measuring the volume of the flow, such a device being arranged in the tub water feed line. Additional devices may be provided such as, for example, a tub projector lamp (or spotlight) or circulation pumps of a whirlpool system which are actuated by the control system.

According to a further aspect, an additional controlling device may be provided for actuating an outlet valve located in the drain of the tub. The additional controlling device is controlled by the electronic control system and comprises a slide housing with a slide. A servo-motor secured on the slide housing is connected to the control system for actuating the slide. The slide is connected with the outlet valve via a push-pull type actuation element acting in a remotely controlled manner. The servo-motor usefully comprises a driven pinion mating with a toothed section of the slide.

The electronic control system is equipped with integrated circuits. By remote control it is possible to start a program in conjunction with which the tub drain is closed and a defined amount of water having a defined, preset or selectable water temperature is filled in the sanitary tub. The pre-selected program may also be designed to determine whether the tub is to be filled immediately or at some later time. The control intelligence is accommodated in the electronics unit of the control device associated with the mixing valve. The program sequence is started by the remote control, whereby a program may be selected from two or more programs. The electronic control system may also comprise an interface for a BUS system and connected by the BUS coupling to a control center for technological home control systems.

BRIEF DESCRIPTION OF THE DRAWINGS

The invention is explained in the following description in greater detail with the help of drawings showing exemplified embodiments, in which.

DETAILED DESCRIPTION OF PREFERRED EMBODIMENTS

Figure 1:
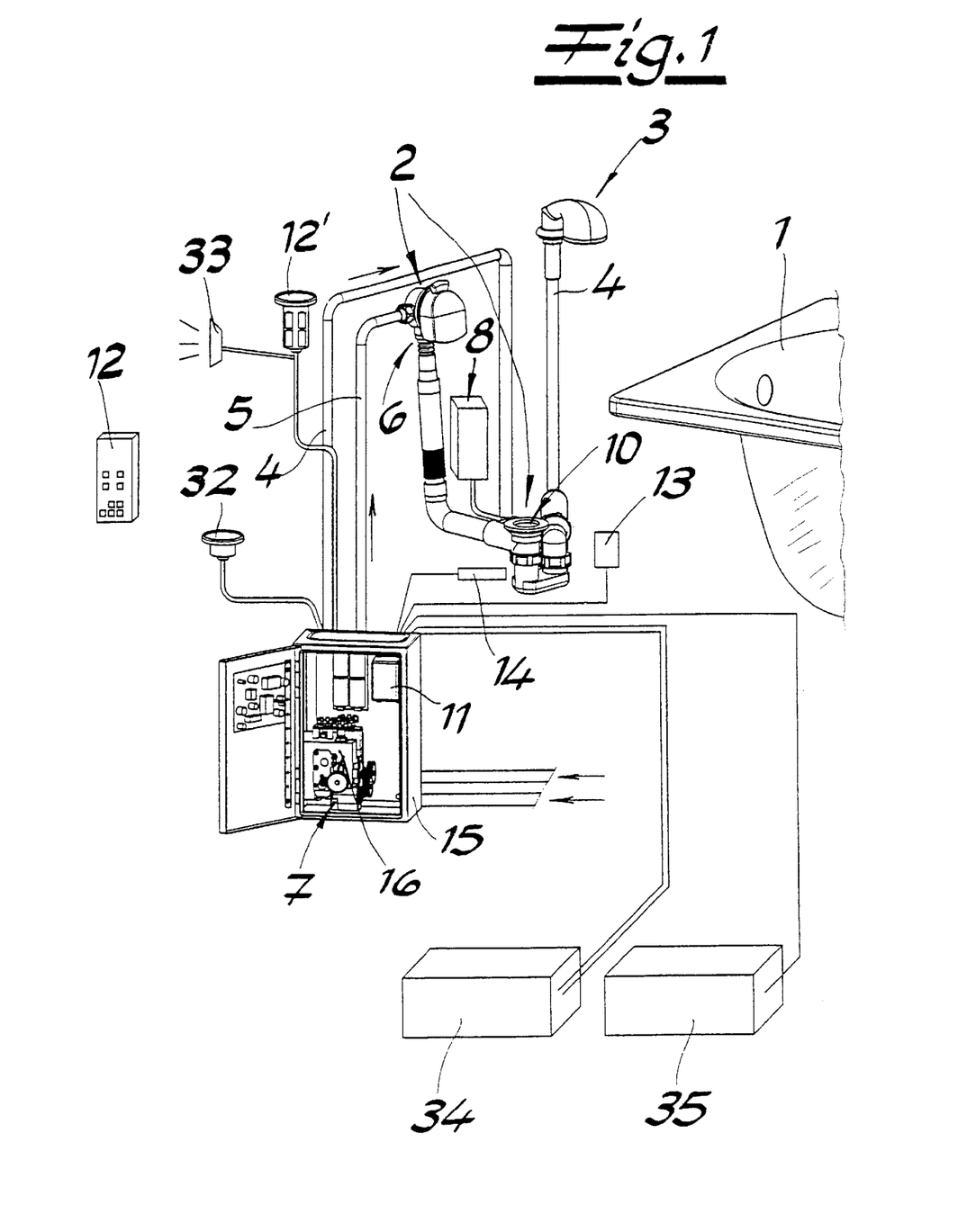
FIG. 1 shows an overall system drawing of a device for controlling the filling of a sanitary tub, and the system components belonging to the device.

The device shown in FIG. 1 serves for controlling the filling of a sanitary tub 1, to which a commonly used set 2 of fittings for the water inlet, water overflow and water drain is connected. A hand-held shower head 3 is also provided. The water can be filled in the tub selectively by way of the connected pipelines 4, 5 of hand-held shower head 3, or via the tub inlet 6.

The basic structure of the device comprises a mixing valve 7 located in the water inlet, a setting device 8 for actuating a drain valve 9 located in the water drain 10, and electronic controlling device 11 for mixing valve 7 and for setting device 8. The electronic control system comprises interfaces for connecting at least one data input and output device 12, 12'; an external temperature sensor 13, and a device 14 for detecting the filling level in the tub. Mixing valve 7 as well as electronic controlling device 11 are accommodated in a terminal connection box 15, which is arranged in a space covered by sanitary tub 1 and enclosed by a tub lining not shown. Electronic controller 11 can be controlled by external data input and output devices 12, 12'. The input and output devices comprise a system for wireless data transmission; keys for starting and stopping the device (ON/OFF); keys for inputting preset values for the water temperature and/or the amount filled in the tub, and/or the time for filling the tub, as well as memory data for storing preset values; and a display device for displaying the preset values. Data input and/or data output devices 12, 12' are advantageously equipped with a watertight foil keyboard and may be designed in the form of a mobile or portable device for remote control, or as a stationary device that is installed, for example, in the ledge of the sanitary tub. Data input and/or output devices 12, 12' allow one to reverse the water feed between water inlet 6 and hand-held shower head 3. Devices 12, 12' also allow one to pre-select the volume of the flow of water and to actuate also additional devices, for example, a tub spotlight.

Figure 2:
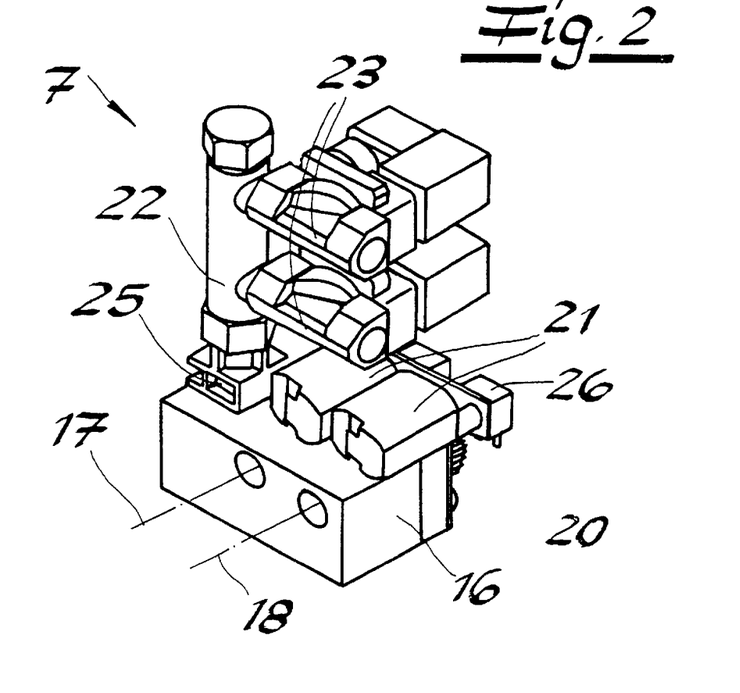
FIGS. 2 and 3 show a perspective view of a mixing valve belonging to the system shown in FIG. 1, viewed from different aspects.
Figure 3:
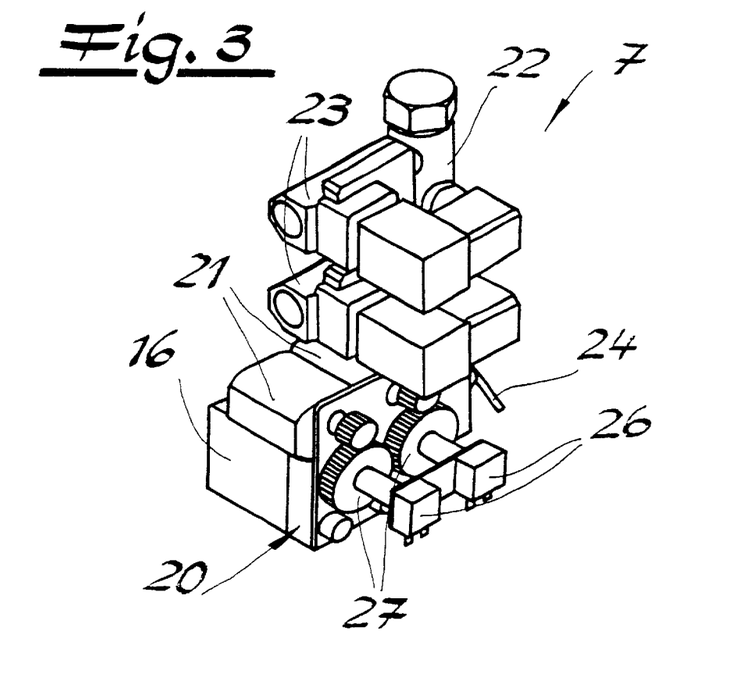
Figure 4:
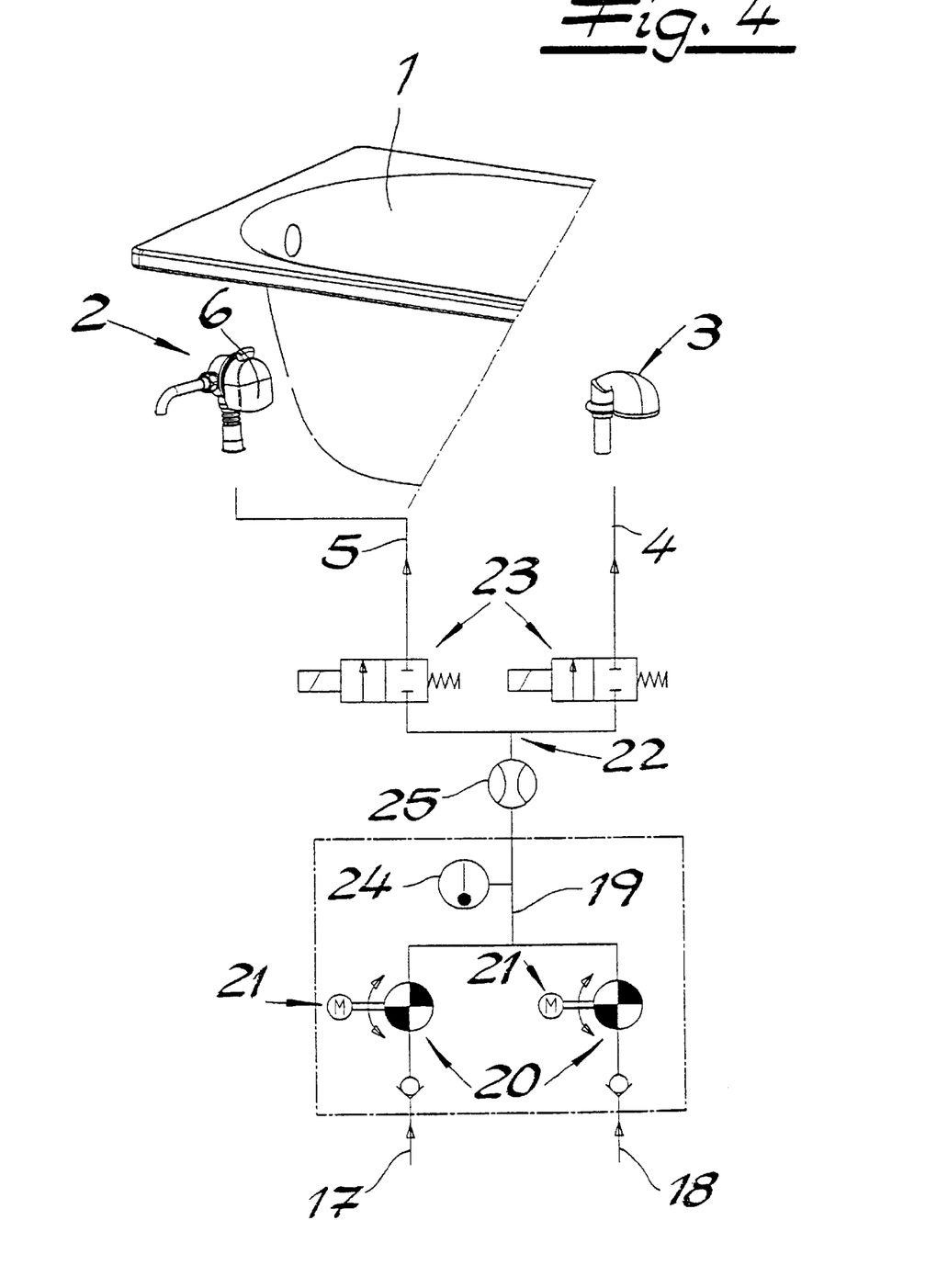
FIG. 4 shows a wiring diagram of the functions for the mixing valve represented in FIGS. 2 and 3.

The constructional design of mixing valve 7 is shown in FIGS. 2 to 4. The mixing valve comprises a valve block 16, which contains the separate inlets 17, 18 for cold and hot water, a mixed-water channel 19 with a mixed-water outlet, and valve chambers for the rotary valves 20 with rotating valve bodies. The two rotary valve drives 21, which are connected to the electronic controlling device 11, are secured on the outer side of valve block 16. A distributor 22 is connected to the mixed-water outlet and comprises two outlets provided with the shutoff valves 23. The outlets are connected via the pipelines 4, 5, with hand-held shower head 3 and tub inlet 6, respectively.

Mixing valve 7 comprises the measuring devices 24, 25 connected to electronic controller 11 for measuring the temperature of the mixed water and the through-put of the mixed water. Temperature sensor 24 for measuring the temperature of the mixed water is inserted in mixed-water channel 19. Measuring device 25 for measuring the rate of through-put of the mixed water consists of a commercially available instrument for measuring the rate of through-put, the instrument being arranged between the mixed-water outlet and distributor 22. The position of rotary valves 20 is detected by the measuring transmitters 26 that tap the angle of rotation of the actuation shafts, which are extended outwards and connected with the valve bodies. Rotary valve drives 21 consist of small geared motors having pinions connected to their driven shafts. The pinions mate with a toothed gear 27 arranged on the actuation shaft of the associated rotary valve. The rotary valves are designed i n the form of rotary slides or stopcock-type valves.

The mixing ratio of the cold and hot water flowing in, as well as the total volume of the water feed, can be controlled by the setting movements of rotary valves 20 controlled by the electronic control system. The shutoff valves 23, which in the embodiment shown are magnetic valves, can be controlled from the electronic control 11 as well.

Figure 5:
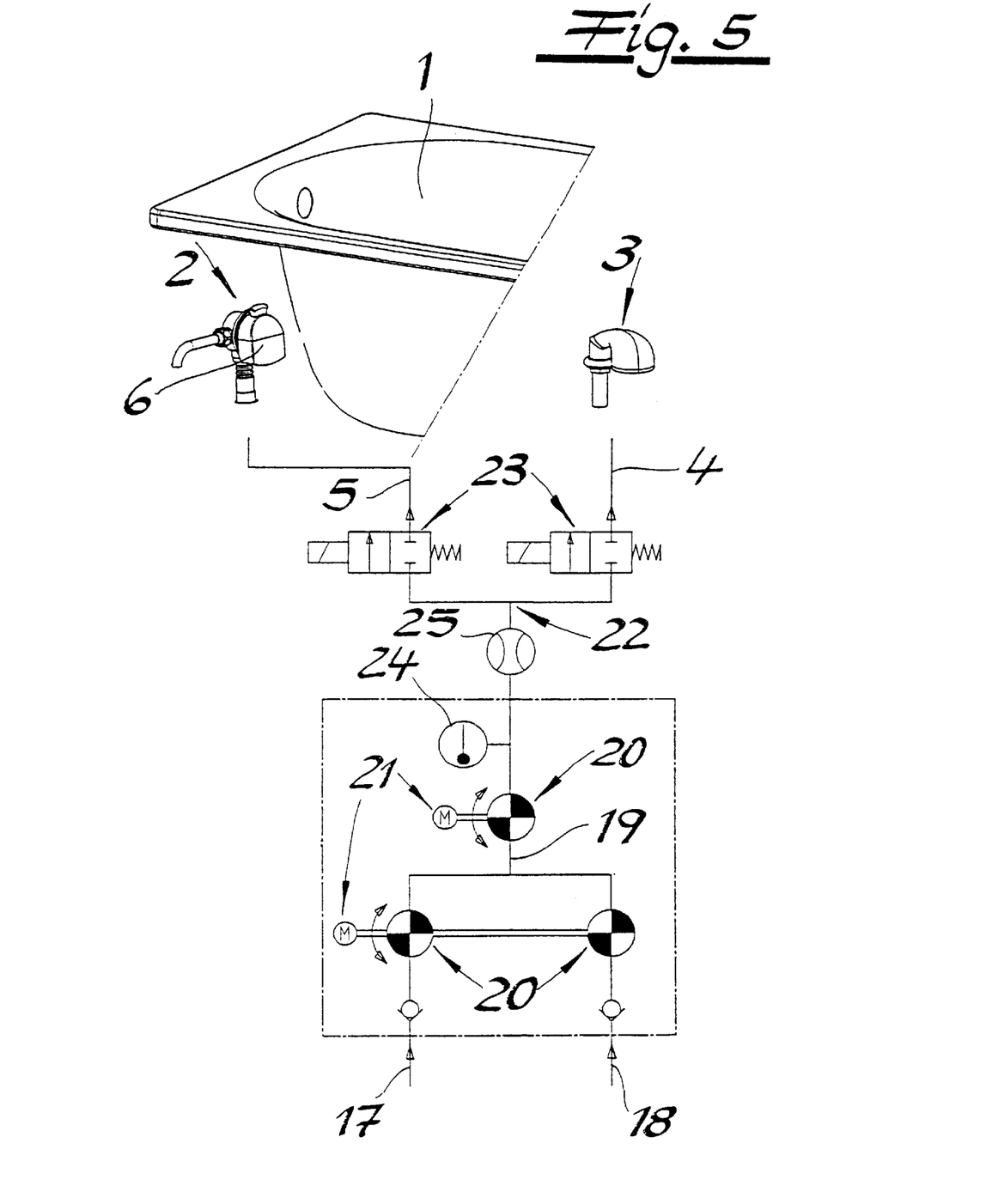
FIG. 5 shows a wiring diagram of the functions for another embodiment of the mixing valve in accordance with the invention.

In the embodiment shown in FIG. 5, a rotary valve 20 is arranged in each of cold water inlet 17, hot water inlet 18, and mixed-water channel 19. The rotary valves 20 located in cold water inlet 17 and in hot water inlet 18 are mechanically coupled with one another and have a common rotary valve drive 21. The second rotary valve drive 21 is associated with the rotary valve 20 located in mixed-water channel 19. The two rotary valves drives 21 can be controlled independently of one another. The mechanical coupling of the rotary valves can be realized in terms of construction in a simple manner. For the purpose of such coupling, the rotary valves have actuation shafts that are extended outwards and on which toothed gears mating with each other are arranged. The mixing ratio of cold and hot water can be varied by actuating the rotary valves 20 located in cold water inlet 17 and hot water inlet 18, the rotary valves being mechanically coupled with each other. When the valves are actuated within their range of adjustment, the clear cross section of flow remains approximately constant overall, so that changes in the mixing ratio will have no bearing on the volume of the flow. The adjustment of the mixing ratio and thus of the water temperature, and the adjustment of the rate of through-put are decoupled from each other, which facilitates the controlling process. By means of a setting motion of the first rotary valve drive, the water temperature may be adjusted in a defined manner. By adjusting the second rotary valve drive, which is associated with the rotary valve located in mixed water channel 19 of the valve block, it is possible to change the rate of through-put and to adjust the rate according to the preset values. The preset values can be input using data input and output devices 12, 12', or such values are preset by a sequence program. By switching the shutoff valves 23 located in the outlets of distributor 22, it is possible to selectively release the path of flow leading to the hand-held shower head 3 or to the tub inlet 6. The reversal between "tub inlet and hand-held shower head" can take place to that extent also by electronic controller 11, and can be actuated by means of data input/data output devices 12, 12' associated with the electronic control system.

Figure 6:
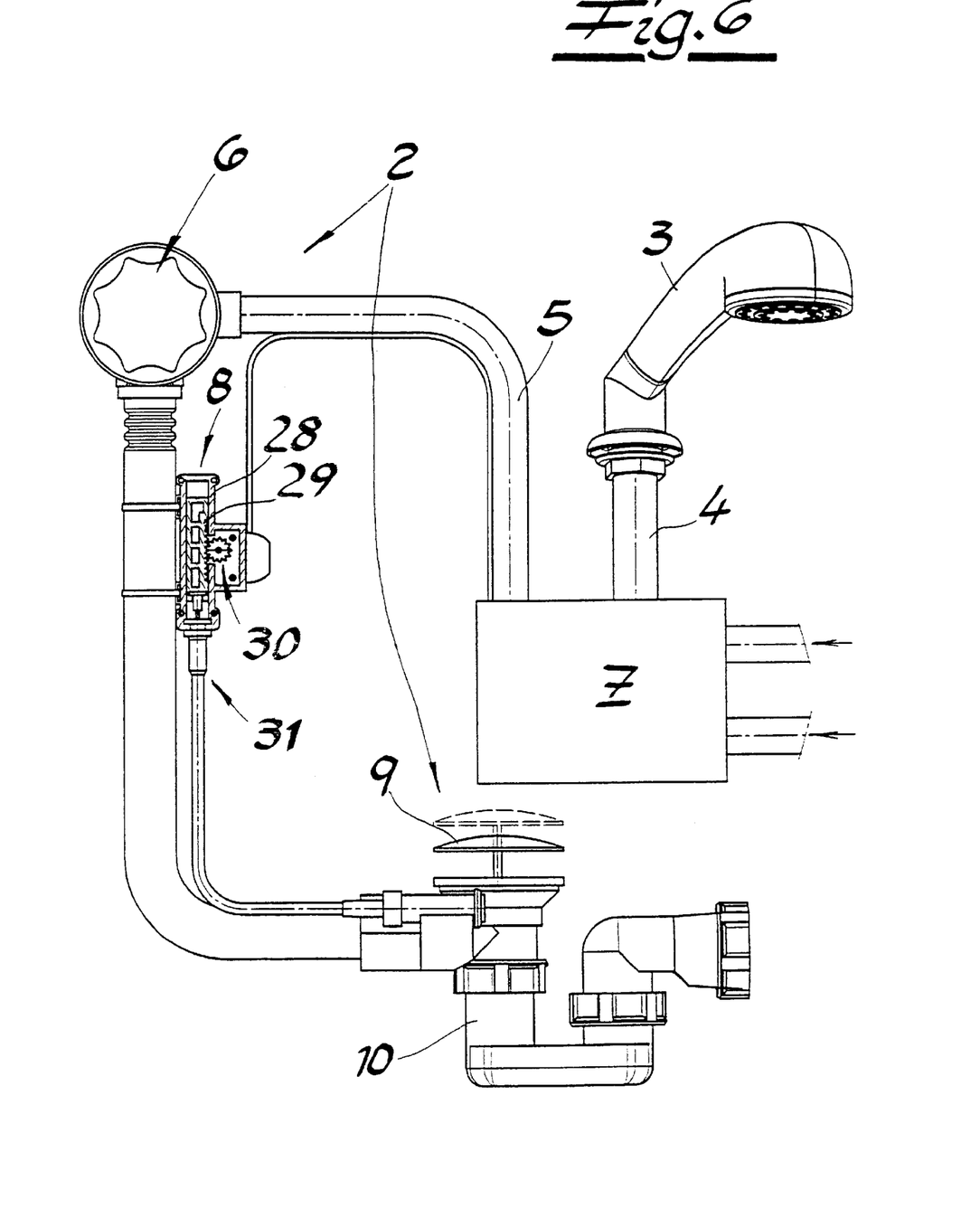
FIG. 6 shows a controlling device belonging to the system shown in FIG. 1 for actuating a outlet valve located in the drain of the tub.
Figure 7:
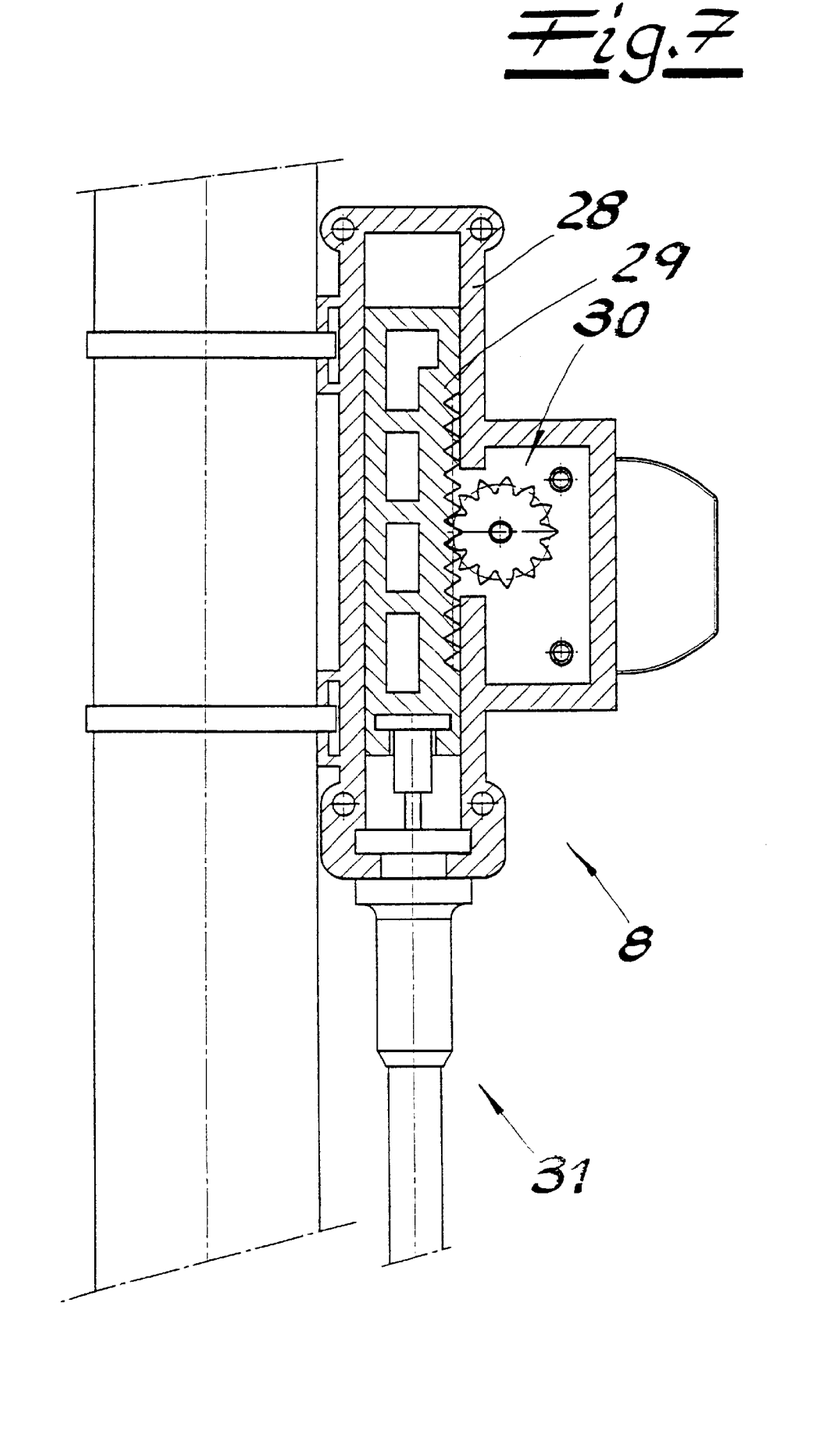
FIG. 7 represents an enlarged view of a portion of FIG. 6.

Electronic controller 11 also acts on the setting device 8. The construction of the setting device 8 can be understood by viewing FIGS. 6 and 7. Setting device 8 for actuating outlet valve 9 comprises a slide housing 28 with a slide 29, as well as a servo-motor 30 secured on the slide housing 28 for actuating the slide 29. The movement is transmitted by a driven pinion of the servo-motor 30, the pinion mating with a toothed section of the slide 29. The slide 29 is connected in a remotely acting manner with the outlet valve 9 by a push-pull actuation element 31. The push-pull actuation element 31 comprises a sleeve, which is clamped in a fixed manner, and an axially movable core. The servo-motor 30 of the setting device can be controlled by the electronic controller 11.

The electronic controller 11 is equipped with integrated circuits. In the exemplified embodiment, a tub thermometer 13, which can be secured in the outer side of the sanitary tub, and a pressure sensor 14, by which the filling level of the tube is measured, are connected to the control system. Instead of measuring the pressure it is possible also to measure the volume of the flow in the tub feeding line. A tub spotlight 32 and/or a loudspeaker 33 which loudspeaker 33 transmits a sound or audible signal that indicates, for example, that the filling of the tub is completed and/or that some malfunction is occurring, may also be provided. The electronic control system also comprises interfaces for a BUS system 34 and for coupling a whirlpool system 35 to the control system. The whirlpool system comprises circulation pumps and the like.

The electronic control system is designed so that a maximum bath water temperature of, for example, 38° C. will not be exceeded as protection against scalding, or that a sound or audible warning signal is emitted when a limit temperature is exceeded. An optical signal may also be emitted in the event of any voltage drop in the batteries/accumulators employed in the data input and/or output devices. A blocking device may also be included, which will automatically interrupt the feed of water to the sanitary tub in the event of any power failure in the power mains.

Accordingly, while a few embodiments of the present invention have been shown and described, it is to be understood that many changes and modifications may be made thereunto without departing from the spirit and scope of the invention as defined in the appended claims.

What is claimed is:

1. A sanitary installation assembly comprising:
   (a) a mixing valve in a water feed line, said mixing valve comprising
      (i) a valve block containing separate inlets for incoming streams of cold water and hot water;
      (ii) a mixed-water channel having a mixed-water outlet; and
      (iii) a plurality of valve chambers for rotary valves having rotating valve bodies;
   (b) an electronic controller coupled to the mixing valve for controlling flow rate and temperature of mixed water;
   (c) at least one data input and output device connected to the controller;
   (d) two rotary drives for actuating the rotary valves secured to an outer side of said valve block and electrically connected to the controller;
   (e) at least one shut-off valve actuated by the controller coupled to the mixed-water outlet;
wherein the cold water inlet has a first rotary valve arranged therein, the hot water inlet has a second rotary valve arranged therein, and first and second rotary valve drives are respectively associated with said first and second rotary valves,
whereby the controller controls positions of the rotary valves to control the mixing ratio of the incoming streams of cold and hot water and water flow volume, said first and second rotary valve drives being controllable independently of each other; and (f) a tub having a lining enclosing a space, the mixing valve and the electronic controller being arranged within the space and controllable by said at least one data input and output device.

2. The assembly according to claim 1, wherein a distributor is connected to the mixed-water outlet, said distributor having at least two outlets provided with shutoff valves actuated by the controller.

3. The assembly according to claim 2, wherein the shutoff valves connected to the distributor comprise magnetic valves.

4. The assembly according to claim 1, wherein the mixing valve comprises a plurality of measuring devices connected to the electronic controller for measuring the temperature of the mixed water and the through-put of the mixed water.

5. The assembly according to claim 1, wherein the rotary valves have a form selected from the group consisting of rotary slides and stopcocks.

6. The assembly according to claim 1, wherein:
(a) each of said rotary valve drives comprises a small-geared motor having a driven shaft;
(b) the assembly further comprises a plurality of pinions connected to the driven shafts, each pinion connected to a respective one of said driven shafts; and
(c) each of the rotary valves is associated with a respective one of said rotary valve drives and has an actuation shaft and a toothed gear arranged on the shaft, the toothed gear mating with the pinion on the associated rotary valve drive.

7. The assembly according to claim 1, wherein the data input and output device comprises (a) a system for wireless or line-bound data transmission; (b) a plurality of keys for starting up the operation, for reversing the path of flow between a tub inlet and a hand-held shower head, and for adjusting the volume of the flow; (c) a plurality of keys for inputting preset values selected from the group consisting of values for water temperature, values for the amount of water filling the tub, and values for the time of tub filling; (d) a plurality of memory keys for storing said preset values; and (e) a display device for displaying adjusted values.

8. The assembly according to claim 1, wherein said electronic controller is connected to a device selected from the group consisting of a fill level detector and a loudspeaker for transmitting an audible signal.

9. The assembly according to claim 1, wherein said electronic controller comprises an interface for a BUS-system.

10. The assembly according to claim 1, further comprising a setting device controllable by said electronic controller device for actuating an outlet valve located in a drain of the tub, said setting device comprising a slide housing with a slide, and a servo-motor secured on the slide housing and connected to the controller for actuating the slide, the slide being connected in a remotely controllable manner to a drain valve by a push-and-pull actuation element.

11. The assembly according to claim 10, wherein the slide has a toothed section and the servo-motor comprises a driven pinion mating with the toothed section of the slide.

12. A sanitary installation assembly comprising:
(a) a mixing valve in a water feed line, said mixing valve comprising
(i) a valve block containing separate inlets for incoming streams of cold water and hot water;
(ii) a mixed-water channel having a mixed-water outlet; and
(iii) a plurality of valve chambers for rotary valves having rotating valve bodies;
(b) an electronic controller coupled to the mixing valve for controlling flow rate and temperature of mixed water;
(c) at least one data input and output device connected to the controller wherein said at least one data input and output device comprises a watertight foil keyboard and is designed in a form selected from the group consisting of a portable remote control device, a device adapted to be inserted in a ledge of a sanitary tub, and a device adapted to be installed on a plaster wall in a socket located beneath the wall plaster;
(d) two rotary drives for actuating the rotary valves secured to an outer side of said valve block and electrically connected to the controller; and
(e) at least one shut-off valve actuated by the controller coupled to the mixed-water outlet;

wherein the cold water inlet has a first rotary valve arranged therein, the hot water inlet has a second rotary valve arranged therein, and first and second rotary valve drives are respectively associated with said first and second rotary valves, whereby the controller controls positions of the rotary valves to control the mixing ratio of the incoming streams of cold and hot water and water flow volume, said first and second rotary valve drives being controllable independently of each other.

13. A sanitary installation assembly comprising:
(a) a mixing valve in a water feed line, said mixing valve comprising
(i) a valve block containing separate inlets for incoming streams of cold water and hot water;
(ii) a mixed-water channel having a mixed-water outlet; and
(iii) a plurality of valve chambers for rotary valves having rotating valve bodies;
(b) an electronic controller coupled to the mixing valve for controlling flow rate and temperature of mixed water;
(c) at least one data input and output device connected to the controller;
(d) two rotary drives for actuating the rotary valves secured to an outer side of said valve block and electrically connected to the controller;
(e) at least one shut-off valve actuated by the controller coupled to the mixed-water outlet:

wherein the cold water inlet has a first rotary valve arranged therein, the hot water inlet has a second rotary valve arranged therein, and first and second rotary valve drives are respectively associated with said first and second rotary valves, whereby the controller controls positions of the rotary valves to control the mixing ratio of the incoming streams of cold and hot water and water flow volume, said first and second rotary valve drives being controllable independently of each other; and (f) a device actuated by said electronic controller, said device selected from the group consisting of a tub spotlight and circulation pumps of a whirlpool system.

* * * * *